(12) United States Patent
Kashiwazaki et al.

(10) Patent No.: US 11,942,875 B2
(45) Date of Patent: Mar. 26, 2024

(54) DRIVE SYSTEM

(71) Applicant: DENSO CORPORATION, Kariya (JP)

(72) Inventors: Takashi Kashiwazaki, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 424 days.

(21) Appl. No.: 17/306,245

(22) Filed: May 3, 2021

(65) Prior Publication Data

US 2021/0257953 A1 Aug. 19, 2021

Related U.S. Application Data

(63) Continuation of application No. PCT/JP2019/042676, filed on Oct. 30, 2019.

(30) Foreign Application Priority Data

Nov. 5, 2018 (JP) .................................. 2018-208164

(51) Int. Cl.
| | | |
|---|---|---|
| *H02P 6/14* | (2016.01) | |
| *H02M 1/08* | (2006.01) | |
| *H02M 7/493* | (2007.01) | |
| *H02M 7/5387* | (2007.01) | |
| *H02P 27/08* | (2006.01) | |
| *H02P 29/68* | (2016.01) | |
| *H02M 1/00* | (2006.01) | |

(52) U.S. Cl.
CPC ........... *H02M 7/5387* (2013.01); *H02M 1/08* (2013.01); *H02M 7/493* (2013.01); *H02M 7/53871* (2013.01); *H02P 27/08* (2013.01); *H02P 29/68* (2016.02); *H02M 1/0043* (2021.05)

(58) Field of Classification Search
CPC .... H02M 1/08; H02M 7/493; H02M 7/53871; H02M 1/0043; H02P 27/08; H02P 29/68; H02P 29/60; H02P 27/06
See application file for complete search history.

(56) References Cited

U.S. PATENT DOCUMENTS

| | | | |
|---|---|---|---|
| 2002/0130581 A1* | 9/2002 | Arai ....................... | H02K 1/165 310/215 |
| 2012/0049775 A1* | 3/2012 | Imai ......................... | H02P 6/10 318/400.26 |

FOREIGN PATENT DOCUMENTS

JP 2016-181949 A 10/2016

* cited by examiner

*Primary Examiner* — Muhammad S Islam

(74) *Attorney, Agent, or Firm* — Oliff PLC

(57) ABSTRACT

A drive system for a rotating electric machine system includes: a first inverter and a second inverter connected to first and second ends of multi-phase windings respectively; a selection unit performing selection between a first setting representing that the first inverter is set to a switch drive inverter and the second inverter is set to a neutral-point drive inverter and a second setting representing that the second inverter is set to the switch drive inverter and the first inverter is set to the neutral-point drive inverter; and a drive control unit performing a switch drive task of performing on-off driving of the upper and lower arm switches of the switch drive inverter to thereby input/output power to/from the rotating electrical machine; and a neutral-point drive task of maintaining at least one of the upper and lower arm switches of the neural-point drive inverter in an on state.

10 Claims, 8 Drawing Sheets

DRIVE SYSTEM

CROSS-REFERENCE TO RELATED APPLICATION

The present application is a continuation application of International Application No. PCT/JP2019/042676, filed on Oct. 30, 2019, which claims priority to Japanese Patent Application No. 2018-208164 filed on Nov. 5, 2018. The contents of these applications are incorporated herein by reference in their entirety.

BACKGROUND

Technical Field

The present disclosure relates to a drive system.

Background Art

Conventionally, a drive system that controls drive of a rotating electric machine having an open delta type winding wire is known. In this drive system, a first DC power supply is connected to a first end of both ends of each phase winding constituting the rotating electric machine via a first inverter. A second DC power supply is connected to a second end of both ends of each phase winding constituting the rotating electric machine via a second inverter. In the drive system described above, in the case where the windings of the respective phases are Y-connected and electric power is supplied to the rotating electric machine, PWM drive is performed on upper and lower arm switches of the first inverter and neutral point drive is performed in which at least one of upper and lower arm switches of the second inverter is maintained in an on state, when electric power is supplied from the first DC power supply. When the electric power is supplied from the second DC power supply, the PWM drive is performed on the second inverter, and the neutral point drive is performed on the first inverter.

SUMMARY

In the present disclosure, provided is a drive system as the following. The drive system for a rotating electric machine system includes: a first inverter and a second inverter connected to first and second ends of multi-phase windings respectively; a selection unit performing selection between a first setting representing that the first inverter is set to a switch drive inverter and the second inverter is set to a neutral-point drive inverter and a second setting representing that the second inverter is set to the switch drive inverter and the first inverter is set to the neutral-point drive inverter; and a drive control unit performing a switch drive task of performing on-off driving of the upper and lower arm switches of the switch drive inverter to thereby input/output power to/from the rotating electrical machine; and a neutral-point drive task of maintaining at least one of the upper and lower arm switches of the neural-point drive inverter in an on state.

BRIEF DESCRIPTION OF THE DRAWINGS

The above object and other objects, features and advantages of the present disclosure will be further clarified by the following detailed description with reference to the accompanying drawings.

DETAILED DESCRIPTION OF THE PREFERRED EMBODIMENTS

[PTL 1] JP 2016-181949 A

Figure 1:
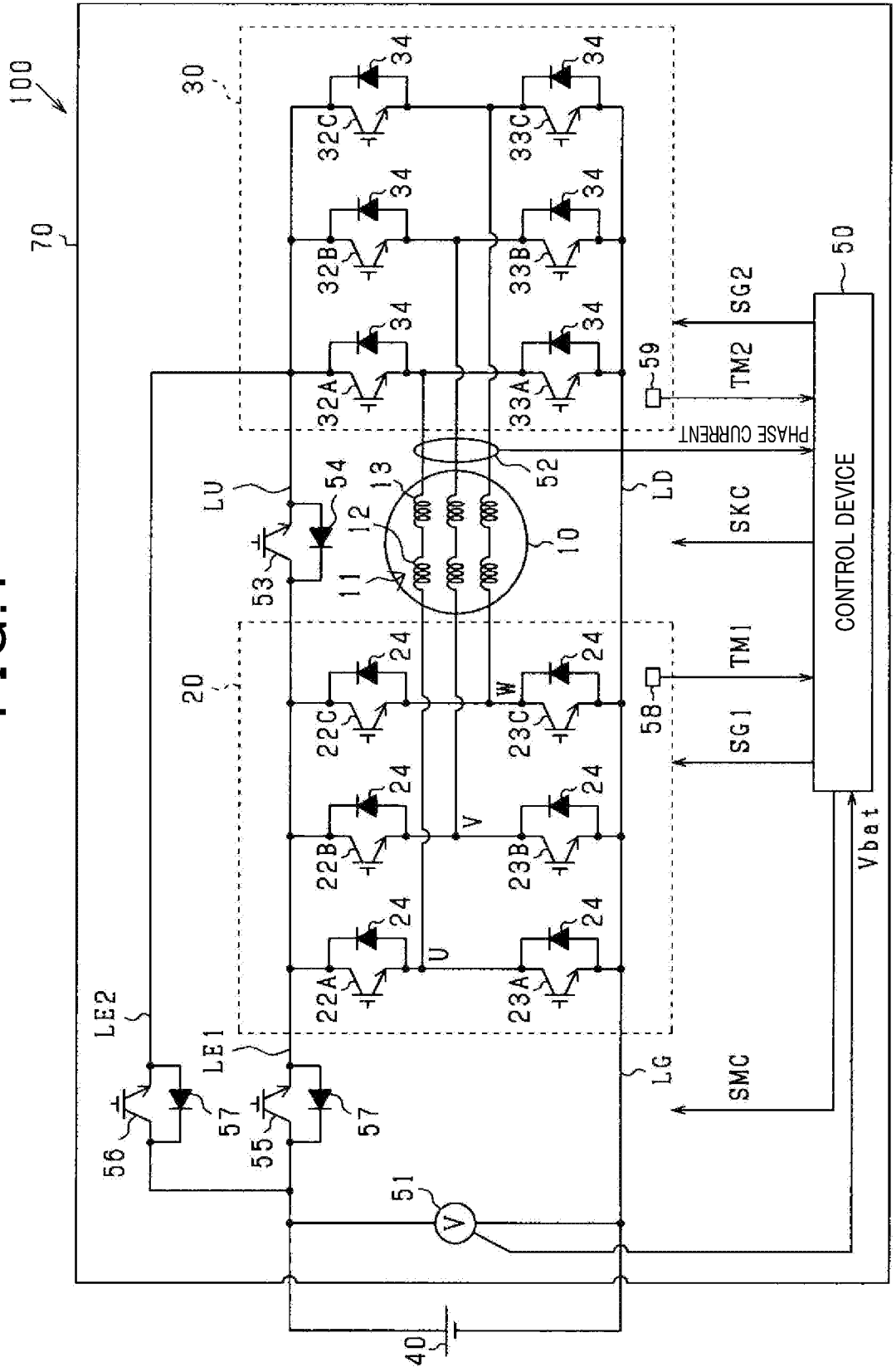
FIG. 1 is an overall configuration diagram of a drive system according to a first embodiment.

As a power storage device that supplies electric power to the rotating electric machine, for example, only a first DC power supply may be provided without provision of a second DC power supply. In this case, when the windings of the respective phases are Y-connected and electric power is supplied to the rotating electric machine, switching drive such as PWM drive is performed on the first inverter, and the neutral point drive is performed on the second inverter. As compared with the neutral point drive, the switching drive causes great switching loss because of a large number of times of switching, per unit time, of the upper and lower arm switches constituting the inverters, which leads to accelerated deterioration of the upper and lower arm switches. Therefore, the first inverter and the second inverter become unbalanced in terms of the deterioration of the upper and lower arm switches. Such a problem rises not only in the case where electric power is supplied from the power storage device to the rotating electric machine, but is also common to the case where electric power is output from the rotating electric machine to the power storage device through power generation of the rotating electric machine. A technique capable of suppressing the unbalanced deterioration between in the first inverter and in the second inverter is desired.

The present disclosure has been made in view of the above circumstances, and an object thereof is to provide a drive system capable of suppressing unbalanced deterioration between in a first inverter and in a second inverter.

The present disclosure relates to a drive system for a rotating electric machine system, the rotating electric machine system including: a rotating electric machine including multi-phase windings, each of the multiphase windings having opposing first and second ends, and a power storage device performing at least one of a power receiving task and a power supplying task with respect to the rotating electric machine. The drive system includes: a first inverter that includes a first series circuit for each of the multi-phase windings, the first series circuit comprising an upper arm switch and a lower arm switch connected in series thereto, a first connection point between the upper arm switch and the lower arm switch for each phase winding being connected to the first end of a corresponding one of the multi-phase windings; a second inverter that includes a second series circuit for each of the multi-phase windings, the second series circuit comprising an upper arm switch and a lower arm switch connected in series thereto, a second connection point between the upper arm switch and the lower arm switch for each phase winding being connected to the second end of a corresponding one of the multi-phase windings; a selection unit that performs selection between a first setting and a second setting, the first setting representing that the first inverter is set to a switch drive inverter and the second inverter is set to a neutral-point drive inverter, the second setting representing that the second inverter is set to the switch drive inverter and the first inverter is set to the neutral-point drive inverter; and a drive control unit that performs: a switch drive task of performing on-off driving of the upper arm switch and lower arm switch of the switch drive inverter selected by the selection unit to thereby perform one of receiving of output power from the rotating electrical machine and supply of input power to the rotating electrical machine; and a neutral-point drive task of maintaining, in an on state, at least one of the upper arm switch and lower arm switch of the neural-point drive inverter selected by the election unit.

In the drive system of the present disclosure, each of the first inverter and the second inverter is connected with the corresponding one of both ends of each phase wiring of the rotating electric machine, when at least one of a power receiving task and a power supplying task is performed between the power storage device and the rotating electric machine, selection between a first setting and a second setting is performed, the first setting representing that the first inverter is set to a switch drive inverter and the second inverter is set to a neutral-point drive inverter, the second setting representing that the second inverter is set to the switch drive inverter and the first inverter is set to the neutral-point drive inverter. As a result, it is possible to suppress unbalanced deterioration between the upper and lower arm switches in the first inverter and the upper and lower arm switches in the second inverter.

First Embodiment

Hereinafter, a first embodiment in which the drive system according to the present disclosure is applied to an in-vehicle rotating electric machine system 100 will be described with reference to the drawings.

As shown in FIG. 1, a drive system 70 according to the present embodiment includes a rotating electric machine 10, a first inverter 20, a second inverter 30, and a control device 50 that controls the rotating electric machine 10.

The rotating electric machine 10 has functions of regenerative power generation and power running drive, and, specifically, is an MG (Motor Generator). The rotating electric machine 10 performs at least one of a power receiving task and a power supplying task with respect to a battery 40. At the time of power running, the electric power supplied from the battery 40 gives a propulsive force to the vehicle, and, at the time of regeneration, the deceleration energy of the vehicle is used to generate electric power and outputs the electric power to the battery 40.

The rotating electric machine 10 has an open delta type three-phase winding 11. The winding 11 is a multi-phase winding corresponding to each phase of U-phase, V-phase and W-phase. Each phase winding 11 includes a first winding portion 12 and a second winding portion 13 which are connected in series. A rotor of the rotating electric machine 10 is connected to drive wheels of the vehicle so as to enable power transmission. The rotating electric machine 10 is, for example, a synchronous machine.

Each phase winding 11 of the rotating electric machine 10 is connected to the battery 40, which is a DC power supply unit, via the first inverter 20. The battery 40 is a rechargeable/dischargeable storage battery, specifically, an assembled battery in which a plurality of lithium ion storage batteries are connected in series. The battery 40 may be another type of storage battery. In the present embodiment, the battery 40 corresponds to the power storage device.

Upper arm switches 22 (22A, 22B and 22C) are switching elements on a high potential side and lower arm switches 23 (23A, 23B and 23C) are switching elements on a low potential side. Each of upper arm switches 22 (22A, 22B and 22C) and the corresponding one of lower arm switches 23 (23A, 23B and 23C) constitutes a first series circuit, these first series circuits are connected in parallel, thereby to configure the first inverter 20. At each phase, a first end of the winding 11 at the corresponding phase of the rotating electric machine 10 is connected to a connection point between the upper arm switch 22 and the lower arm switch 23. In the present embodiment, voltage-controlled semiconductor switching elements are used as the switches 22 and 23, and, more specifically, IGBTs are used. A freewheel diode 24 is connected to each of the switches in anti-parallel.

Upper arm switches 32 (32A, 32B and 32C) are switching elements on a high potential side and lower arm switches 33 (33A, 33B and 33C) are switching elements on a low potential side. Each of upper arm switches 32 (32A, 32B and 32C) and the corresponding one of lower arm switches 33 (33A, 33B and 33C) constitutes a second series circuit, these second series circuits are connected in parallel, thereby to configure the second inverter 30. At each phase, a second end of the winding 11 at the corresponding phase of the rotating electric machine 10 is connected to a connection point between the upper arm switch 32 and the lower arm switch 33. In the present embodiment, voltage-controlled semiconductor switching elements are used as the switches 32 and 33, and, more specifically, IGBTs are used. A freewheel diode 34 is connected to each of the switches in anti-parallel.

The high potential side of the battery 40 and the high potential side of the first inverter 20 are connected by a first power supply wire LE1, and the low potential side of the battery 40 and the low potential side of the first inverter 20 are connected by a ground wire LG. Further, the high potential side of the first inverter 20 and the high potential side of the second inverter 30 are connected by a high potential side connection wire LU, and the low potential side of the first inverter 20 and the low potential side of the second inverter 30 are connected by a low potential side connection wire LD. Thus, the second inverter 30 is connected to the battery 40 via the first inverter 20. In the present embodiment, the first power supply wire LE1 and the ground wire LG correspond to a first connection wire.

A drive changeover switch 53 is provided on the high potential side connection wire LU. In the present embodiment, a voltage-controlled semiconductor switching element is used as the drive changeover switch 53, and, more specifically, an IGBT is used. A freewheel diode 54 is connected to the drive changeover switch 53 so that current flows from the second inverter 30 to the first inverter 20 in the forward direction. In the present embodiment, the drive changeover switch 53 corresponds to a third switch.

The control device 50 acquires detected values from a voltage sensor 51 that detects power supply voltage Vbat of the battery 40, a phase current sensor 52 that detects the current flowing through each phase winding 11 of the rotating electric machine 10, and a rotation angle sensor (not shown) that detects the rotation angle of the rotating electric machine 10, and the like, at the time of an operation in which power running or power generation of the rotating electric machine 10 is performed. Further, the control device 50 acquires detected values from a first temperature sensor 58 that detects a first temperature TM1 which is the temperature of the first inverter 20 and a second temperature sensor 59 that detects a second temperature TM2 which is the temperature of the second inverter 30. The control device 50 controls the first inverter 20 and the second inverter 30 in order to control a controlled quantity of the rotating electric machine 10 to its command value based on the acquired detected values. The controlled quantity is, for example, torque.

Specifically, in the control of the first inverter 20, the control device 50 outputs a first drive signal SG1 corresponding to each of the switches 22 and 23 to the switches 22 and 23, in order to alternately turn the switches 22 and 23 into an on state (closed state) with a dead time in between. The first drive signal SG1 takes either an on command to instruct exchanging to the on state of the switch or an off command to instruct exchanging to an off state (open state).

Also, in the control of the second inverter 30, the control device 50 outputs a second drive signal SG2 corresponding to each of the switches 32 and 33 to the switches 32 and 33, in order to alternately turn the switches 32 and 33 into the on state with a dead time in between.

Further, the control device 50 acquires an operating state of the rotating electric machine 10 based on the acquired detected values. The operating state of the rotating electric machine 10 is, for example, a high-speed rotation state or a low-speed rotation state. The control device 50 generates a drive switching signal SKC and outputs the generated drive switching signal SKC to the drive changeover switch 53, in order to perform the switching operation of the drive changeover switch 53 based on the acquired operation state. The control device 50 generates a first drive signal SG1 and a second drive signal SG2 so as to correspond to the generated drive switching signal SKC.

Specifically, when the rotating electric machine 10 is in a high-speed rotation state, the drive changeover switch 53 is maintained in the on state, and the first inverter 20 and the second inverter 30 are driven by H-bridge. In the H-bridge drive, the first inverter 20 and the second inverter 30 are controlled by PWM performed drive so that the switches of different phases of the first inverter 20 and the second inverter 30 are synchronized. Hereinafter, the operation mode in which the first inverter 20 and the second inverter 30 are driven by H-bridge is referred to as a second mode. The PWM drive is intended to control the states of the upper and lower arm switches of each phase based on the comparison in magnitude between a target voltage, which is a target value of an output voltage to the rotating electric machine 10, and a carrier signal such as a triangular wave signal. In the present embodiment, the PWM drive corresponds to switching drive.

Figure 2:
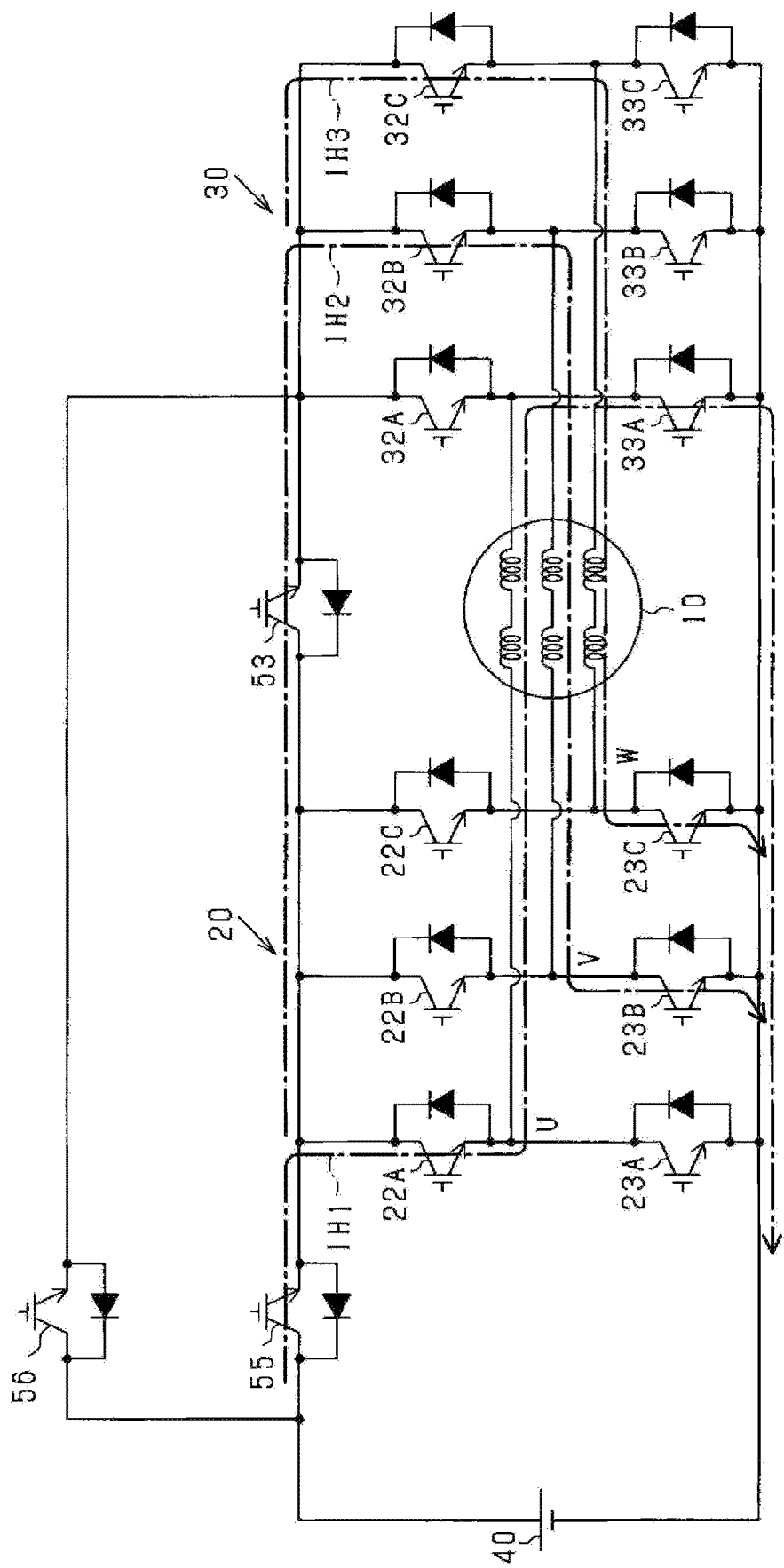
FIG. 2 is a diagram showing a current path in a second mode.

FIG. 2 shows a current path in the second mode at the time of power running of the rotating electric machine 10. In the example shown in FIG. 2, control is performed so that the U-phase upper arm switch of the first inverter 20 and the U-phase lower arm switch of the second inverter 30, the V-phase lower arm switch of the first inverter 20 and the V-phase of the second inverter 30 of the upper arm switch, and the W-phase lower arm switch of the first inverter 20 and the W-phase upper arm switch of the second inverter 30 are synchronized. In FIG. 2, the voltage sensor 51, the phase current sensor 52, and the like are not shown. The same applies to FIGS. 3 and 4.

As shown in FIG. 2, when the upper arm switches 22A and lower arm switches 23B and 23C of the first inverter 20 and the upper arm switches 32B and 32C and lower arm switch 33A of the second inverter 30 are in the on state, current flows through paths indicated by arrows IH1 to IH3. The paths indicated by the arrows IH1 to IH3 include the high potential side connection wire LU and the low potential side connection wire LD. Therefore, the second mode can be said to be an operation mode in which at least one of a power receiving task and a power supplying task with respect to the rotating electric machine 10 is performed via the high potential side connection wire LU and the low potential side connection wire LD.

Also, when the rotating electric machine 10 is in a low-speed rotation state, the drive changeover switch 53 is maintained in the off state, and the first inverter 20 and the second inverter 30 are Y-connection-driven. In the Y-connection drive, one of the first inverter 20 and the second inverter 30 is controlled by the PWM drive, and the other is neutral point-driven. The neutral point drive is intended to maintain the upper arm switch on the side where the drive changeover switch 53 is provided in the on state, and to maintain the lower arm switch on the side where the drive changeover switch 53 is not provided in the off state, among the switches of the inverter involved. By the neutral point drive, the inverter involved serves as a neutral point, and the rotating electric machine 10 is Y-connected. Hereinafter, the operation mode in which the first inverter 20 and the second inverter 30 are Y-connection-driven is referred to as a first mode.

Figure 3:
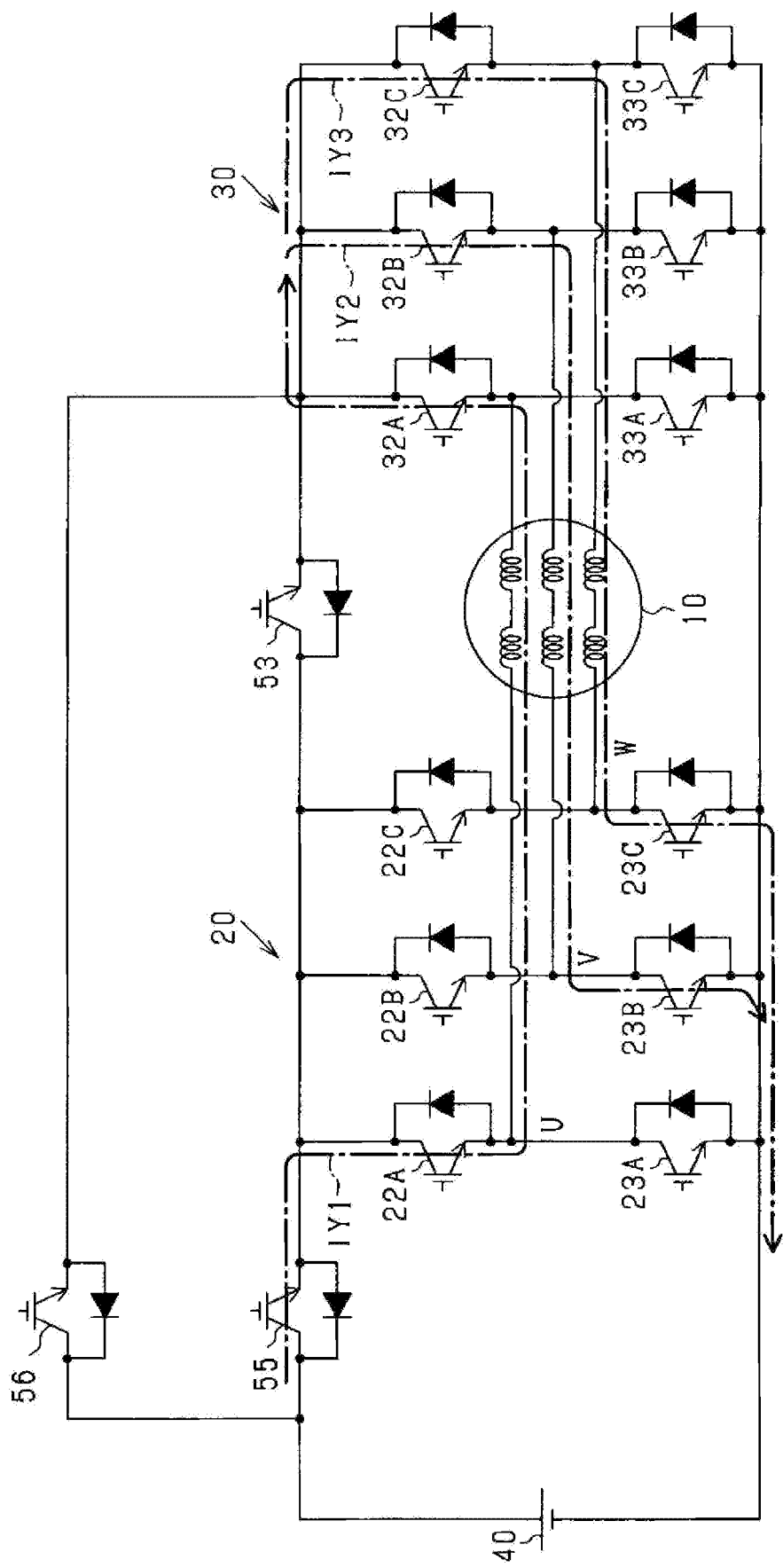
FIG. 3 is a diagram showing a current path at the time of a first Y-connection drive in a first mode.

FIG. 3 shows a current path in the first mode at the time of power running of the rotating electric machine 10. In the example shown in FIG. 3, the first inverter 20 on the battery 40 side is PWM-driven, and the second inverter 30 on the side opposite to the battery 40 is neutral point-driven. Specifically, in the first inverter 20 and the second inverter 30, the PWM drive task of the switches 22 and 23 of the first inverter 20 is performed to preform supply of input power to the rotating electric machine 10, and the neutral point drive task of maintaining the upper arm switch 32 of the second inverter 30 in the on state is performed. Therefore, the first mode can be said to be an operation mode in which at least one of a power receiving task and a power supplying task with respect to the rotating electric machine 10 is performed by the PWM drive and the neutral point drive.

As shown in FIG. 3, when the upper arm switches 22A and lower arm switches 23B and 23C of the first inverter 20 and the upper arm switches 32A, 32B and 32C of the second inverter 30 are in the on state, current flows through paths indicated by arrows IY1 to IY3.

As compared with the neutral point control, the PWM drive involves a large number of times of switching, per unit time, of the switches constituting the inverter, which leads to accelerated deterioration of the switches. Therefore, in the first mode in which the first inverter 20 and the second inverter 30 are Y-connection-driven, when the first inverter 20 is always PWM-driven and the second inverter 30 is always neutral point-driven, the first inverter 20 and the second inverter 30 are unbalanced in terms of the deterioration of the switches.

The drive system 70 of the present embodiment includes a second power supply wire LE2, a first switch 55, and a second switch 56. The second power supply wire LE2 connects the high potential side of the battery 40 and the high potential side of the second inverter 30 by a path different from that of the first power supply wire LE1 and the high potential side connection wire LU. The first switch 55 is provided on the first power supply wire LE1, and the second switch 56 is provided on the second power supply wire LE2. In the present embodiment, voltage-controlled semiconductor switching elements are used as the switches 55 and 56, and, more specifically, IGBTs are used. A freewheel diode 57 is connected to each of the switches 55 and 56 so that current flows from the corresponding inverter to the battery 40 in the forward direction. In the present embodiment, the second power supply wire LE2, the ground wire LG, and the low potential side connection wire LD correspond to a second connection line.

In the first mode, the control device 50 performs, based on predetermined conditions, an exchange control processing to exchange the inverter on which the PWM drive is performed and the inverter on which the neutral point drive is performed, in the first inverter 20 and the second inverter 30, the exchange control processing corresponds to selection between a first setting and a second setting, the first setting representing that the first inverter 20 is set to a PWM drive inverter and the second inverter is set to a neutral-point drive inverter, the second setting representing that the second inverter is set to the PWM drive inverter and the first inverter is set to the neutral-point drive inverter. In the exchange control processing, the control device 50 switches on one of the first switch 55 and the second switch 56 and switches off the other one. Specifically, in order to alternately turn the switches 55 and 56 into the on state with a dead time in between, a mode switching signal SMC corresponding to each of the switches 55 and 56 is output to each of the switches 55 and 56. As a result, it is possible to suppress unbalanced deterioration of the switches between in the first inverter 20 and in the second inverter 30.

In the example shown in FIG. 3, the first switch 55 is in the on state, and the drive changeover switch 53 and the second switch 56 are in the off state. In this case, the PWM drive task is performed using the first inverter 20 being switched on by the control device 50, and the neutral point drive task is performed using the second inverter 30 being switched off by the control device 50. Hereinafter, the Y-connection drive in which the first inverter 20 is PWM-driven and the second inverter 30 is neutral point-driven is referred to as a first Y-connection drive.

Figure 4:
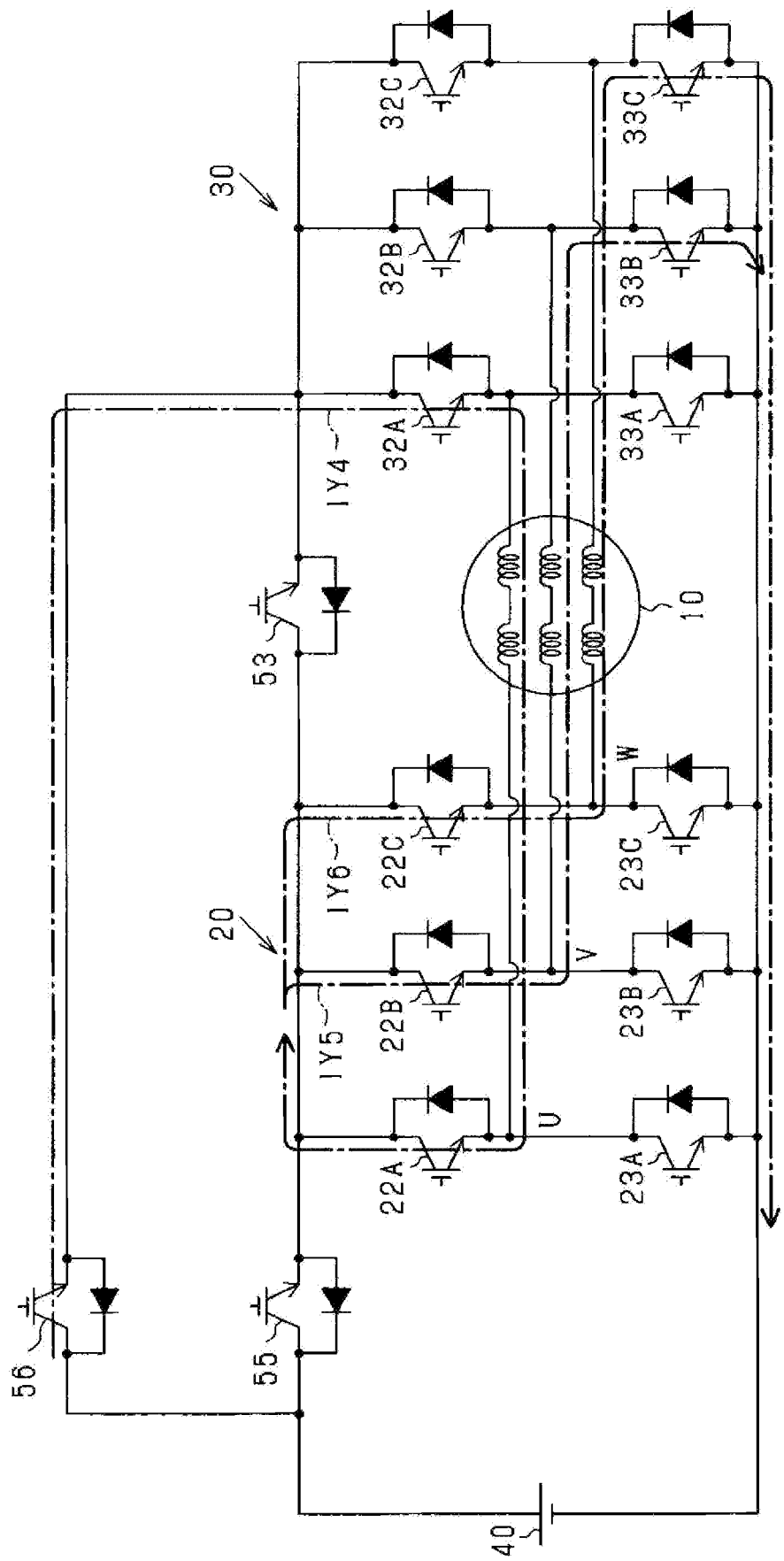
FIG. 4 is a diagram showing a current path at the time of a second Y-connection drive in the first mode.

FIG. 4 shows a current path in the first mode at the time of power running of the rotating electric machine 10. In the example shown in FIG. 4, the drive changeover switch 53 and the first switch 55 are in the off state, and the second switch 56 is in the on state. In this case, the PWM drive is performed on the second inverter 30 on the side of the second switch 56 controlled to the on state, and the neutral point drive is performed on the first inverter 20 on the side of the first switch 55 controlled to the off state. Hereinafter, the Y-connection drive in which the first inverter 20 is neutral point-driven and the second inverter 30 is PWM-driven is referred to as a second Y-connection drive. Therefore, the Y-connection drive includes the first Y-connection drive and the second Y-connection drive.

As shown in FIG. 4, when the upper arm switches 22A, 22B and 22C of the first inverter 20 and the upper arm switches 32A and lower arm switches 33B and 33C of the second inverter 30 are in the on state in the second Y-connection drive, current flows through paths indicated by arrows IY4 to IY6.

Figure 5:
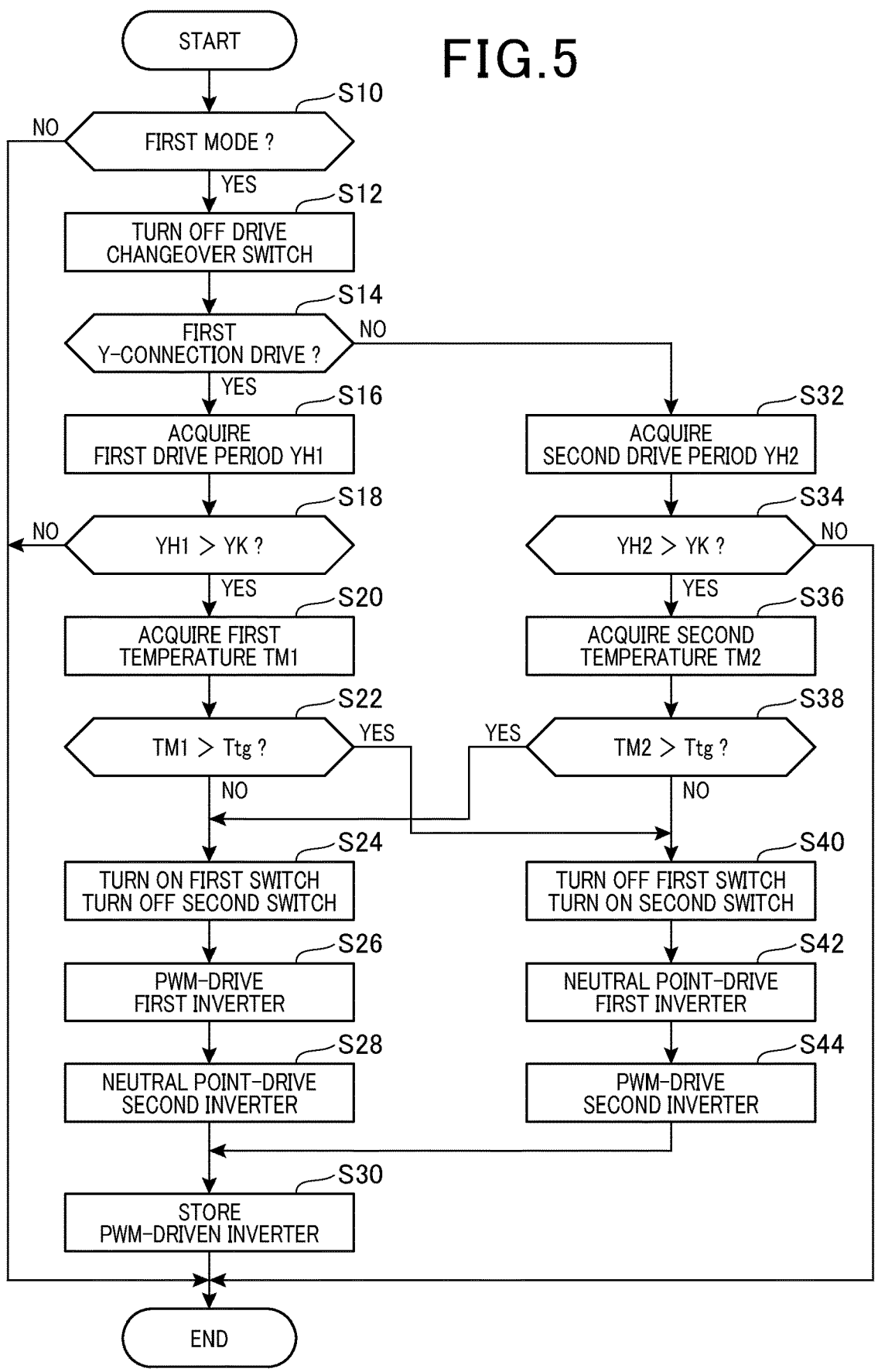
FIG. 5 is a flowchart of exchange control processing.

FIG. 5 shows a flowchart of exchange control processing. In the present embodiment, the flowchart of the exchange control processing at the time of power running of the rotating electric machine 10 is illustrated. The control device 50 repeatedly performs the exchange control processing at predetermined time intervals during the operation of the rotating electric machine 10.

When the exchange control processing is started, first, in step S10, it is determined whether the operation mode is the first mode. The operation mode is determined based on the operating state of the rotating electric machine 10.

If a negative determination is made in step S10, the exchange control processing ends. The control device 50 maintains the drive changeover switch 53 in the on state for switching to the second mode, and performs the second mode. On the other hand, if an affirmative determination is made in step S10, it maintains the drive changeover switch 53 in the off state and performs the first mode, in step S12. In the present embodiment, the processing in step S10 corresponds to a mode control unit.

In step S14, it is determined whether the Y-connection drive in the previous exchange control processing is the first Y-connection drive. The control device 50 stores therein the inverter which is PWM driven in the previous exchange control processing, and the control device 50 determines the Y-connection drive in the previous exchange control processing by the stored inverter. The previous exchange control processing is recent exchange control processing in which the Y-connection drive is performed, and, for example, means the previous exchange control processing when one of the first Y-connection drive and the second Y-connection drive is performed in the previous exchange control processing.

If an affirmative determination is made in step S14, a first drive period YH1, which is a period during which the first Y-connection drive is continuously performed, is acquired in step S16. The control device 50 measures an elapsed period from the exchange between the first Y-connection drive and the second Y-connection drive, and acquires the elapsed period from exchanging from the second Y-connection drive to the first Y-connection drive as the first drive period YH1.

In step S18, it is determined whether a predetermined reference period YK has elapsed in the first drive period YH1 acquired in step S16. The predetermined reference period YK is a period during which it is possible to suppress an excessive temperature rise of the switches of the inverter which is PWM-driven by continuously performing the first Y-connection drive or the second Y-connection drive. In the present embodiment, the reference period YK corresponds to a predetermined period.

If a negative determination is made in step S18, the exchange control processing ends. On the other hand, if an affirmative determination is made in step S18, the first temperature TM1 is acquired using a first temperature sensor 58 in step S20. That is, the first temperature TM1 of the first inverter 20 at which the PWM drive is performed in the first Y-connection drive is acquired.

In step S22, it is determined whether the first temperature TM1 acquired in step S22 is higher than a predetermined threshold temperature Ttg. The predetermined threshold temperature Ttg is a temperature at which it is possible to suppress an excessive temperature rise of the inverter switches, and, specifically, is set to a temperature lower than the upper limit temperature of the switches.

If a negative determination is made in step S22, the first Y-connection drive (S24 to S28) is continued. Specifically, in step S24, the first switch 55 is maintained in the on state, and the second switch 56 is maintained in the off state. In the subsequent step S26, the PWM drive is performed on the first inverter 20 on the side of the first switch 55 controlled to the on state, and, in step S28, the neutral point drive is performed on the second inverter 30 on the side of the second switch 56 controlled to the off state.

On the other hand, if an affirmative determination is made in step S22, the Y-connection drive is exchanged to the second Y-connection drive (S40 to S44). Specifically, in step S40, the first switch 55 is switched off, and the second switch 56 is switched on. In the subsequent step S42, the neutral point drive is performed on the first inverter 20 on the side of the first switch 55 controlled to the off state, and, in step S44, the PWM drive is performed on the second inverter 30 on the side of the second switch 56 controlled to the on state.

If a negative determination is made in step S14, a second drive period YH2, which is a period during which the second Y-connection drive is continuously performed, is acquired in step S32. The control device 50 acquires the elapsed period from the exchanging from the first Y-connection drive to the second Y-connection drive as a second drive period YH2. In the subsequent step S34, it is determined whether the predetermined reference period YK has elapsed in the second drive period YH2 acquired in step S32. In the present embodiment, the processing in steps S16 and S32 corresponds to a drive period acquisition unit.

If a negative determination is made in step S34, the exchange control processing ends. On the other hand, if an affirmative determination is made in step S34, the second temperature TM2 is acquired using a second temperature sensor 59 in step S36. That is, the second temperature TM2 of the second inverter 30 at which the PWM drive is performed in the second Y-connection drive is acquired. In the subsequent step S38, it is determined whether the second temperature TM2 acquired in step S36 is higher than the predetermined threshold temperature Ttg. In the present embodiment, the processing in steps S20 and S36 corresponds to a drive period acquisition unit.

If a negative determination is made in step S38, the second Y-connection drive (S40 to S44) is continued. On the other hand, if an affirmative determination is made in step S38, the Y-connection drive is exchanged to the first Y-connection drive (S24 to S28). In the present embodiment, the processing in steps S22 and S38 corresponds to a selection unit, and the processing in steps S24 to S28 and S40 to S44 corresponds to a drive control unit.

When the first Y-connection drive or the second Y-connection drive is performed, in step S30, the inverter on which the PWM drive is performed in the first Y-connection drive or the second Y-connection drive is stored, and the exchange control processing ends.

Figure 6:
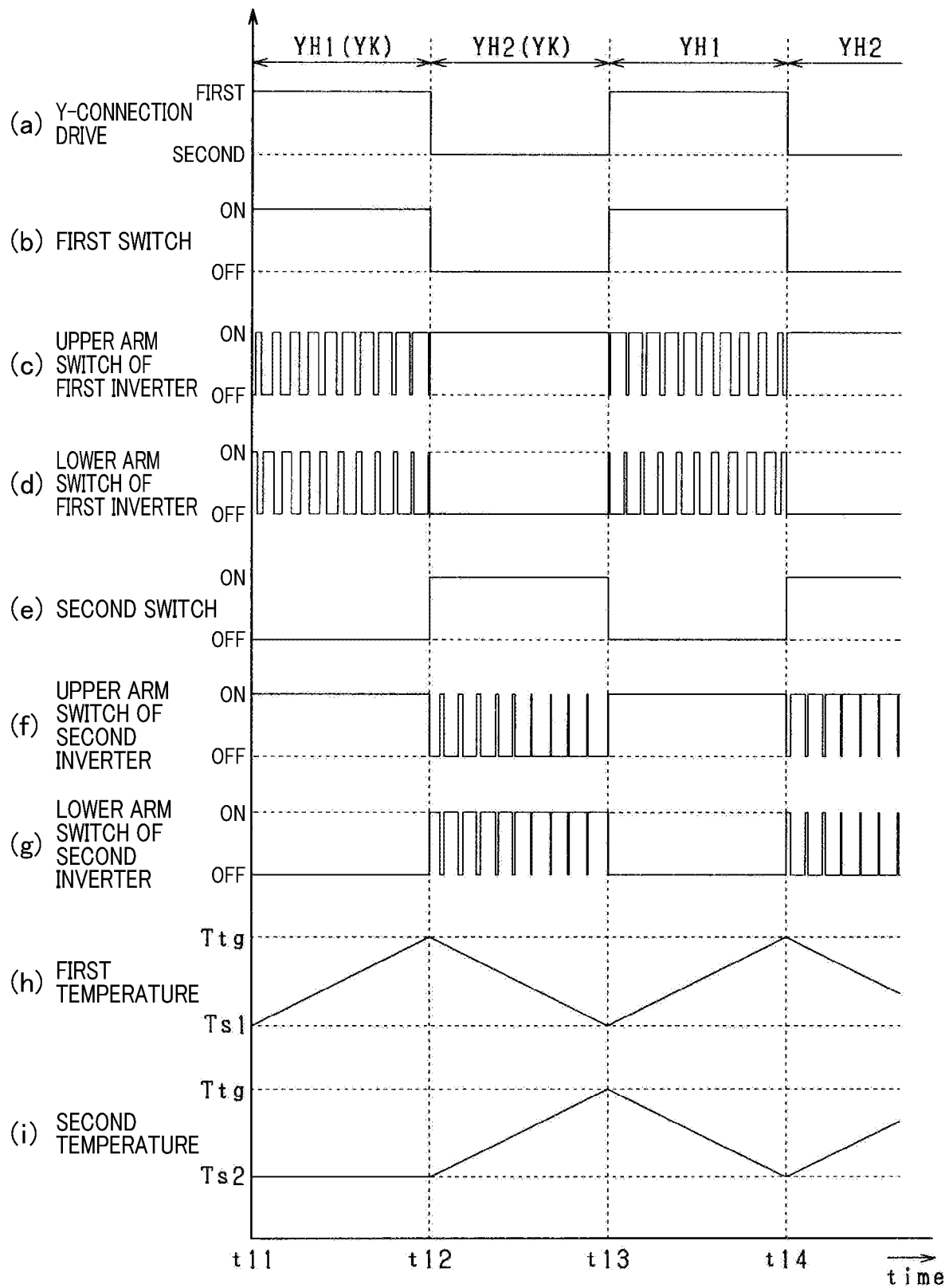
FIG. 6 is a diagram showing a transition between the first Y-connection drive and the second Y-connection drive in the exchange control processing.

Subsequently, FIG. 6 shows a transition between the first Y-connection drive and the second Y-connection drive in the exchange control processing. Here, FIG. 6(a) shows a transition between the first Y-connection drive and the second Y-connection drive; FIG. 6(b) shows a transition of the state of the first switch 55; FIG. 6(c) shows a transition of the state of the upper arm switch 22 of the first inverter 20; and FIG. 6(d) shows a transition of the state of the lower arm switch 23 of the first inverter 20. Further, FIG. 6(e) shows a transition of the state of the second switch 56; FIG. 6(f) shows a transition of the state of the upper arm switch 32 of the second inverter 30; and FIG. 6(g) shows a transition of the state of the lower arm switch 33 of the second inverter 30. Further, FIG. 6(h) shows a transition of the first temperature TM1, and FIG. 6(i) shows a transition of the second temperature TM2.

As shown in FIGS. 6(a) to 6(g), when the first Y-connection drive is started at time t11, the first switch 55 is maintained in the on state, and the PWM drive is performed on the switches 22 and 23 of the first inverter 20. On the other hand, the second switch 56 is maintained in the off state, and the neutral point drive is performed on the switches 32 and 33 of the second inverter 30.

As compared with the neutral point drive, the PWM drive involves a larger number of times of switching, per unit time, of the switches constituting the inverter. As a result, the switches 22 and 23 of the first inverter 20 deteriorate faster than the switches 32 and 33 of the second inverter 30. Further, as shown in FIGS. 6(h) and 6(i), the first temperature TM1 rises from an initial temperature TS1, while the rise of the second temperature TM2 from the initial temperature TS2 is suppressed.

When the first temperature TM1 reaches the threshold temperature Ttg at time t12 when the reference period YK has elapsed from the time t11, the Y-connection drive is exchanged from the first Y-connection drive to the second Y-connection drive. That is, the reference period YK can be said to be a period during which the temperature of the PWM-driven inverter reaches the threshold temperature Ttg by continuously performing the first Y-connection drive or the second Y-connection drive.

When Y-connection drive is exchanged to the second Y-connection drive at the time t12, the first switch 55 is maintained in the off state, and the neutral point drive is performed on the switches 22 and 23 of the first inverter 20. On the other hand, the second switch 56 is maintained in the on state, and the PWM drive is performed on the switches 32 and 33 of the second inverter 30.

Therefore, the deterioration of the switches 22 and 23 of the first inverter 20 is suppressed, as compared with the switches 32 and 33 of the second inverter 30. As a result, it is possible to suppress unbalanced deterioration of the switches between in the first inverter 20 and in the second inverter 30. Further, as shown in FIGS. 6(h) and 6(i), the second temperature TM2 rises from the initial temperature TS2, while the first temperature TM1 falls from the threshold temperature Ttg. As a result, excessive rise of the temperature of the switches in the first inverter 20 and the second inverter 30 is suppressed.

When the second temperature TM2 reaches the threshold temperature Ttg at time t13 when the reference period YK has elapsed from the time t12, the Y-connection drive is exchanged again from the second Y-connection drive to the first Y-connection drive. After that, at time t14 and the like, exchanging between the first Y-connection drive and the second Y-connection drive is repeated.

According to the present embodiment described in detail above, the following effects can be obtained.

In the drive system 70 of the present embodiment, when at least one of a power receiving task and a power supplying task is performed between the battery 40 and the rotating electric machine 10, the inverter on which the PWM drive is performed and the inverter on which the neutral point drive is performed can be mutually exchanged, in the first inverter 20 and the second inverter 30, that is, alternate selection between the first setting and the second setting is performed. As a result, it is possible to suppress unbalanced deterioration of the switches between in the first inverter 20 and in the second inverter 30.

Specifically, the first switch 55 is provided on the first power supply wire LE1 that connects the high potential side of the battery 40 and the high potential side of the first inverter 20.

Also, the second switch 56 is provided on the second power supply wire LE2 that connects the high potential side of the battery 40 and the high potential side of the second inverter 30. One of the first switch 55 and the second switch 56 is controlled to the on state, and the PWM drive is performed on the inverter on the side of the switch controlled to the on state. Further, the other switch is controlled to the off state, and the neutral point drive is performed on the inverter on the side of the switch controlled to the off state. Therefore, of the first switch 55 and the second switch 56, the switch to be controlled to the on state is mutually exchanged, thereby making it possible to exchange the inverter on which the PWM drive is performed and the inverter on which the neutral point drive is performed.

In particular, in the drive system 70 of the present embodiment, the first switch 55 and the second switch 56 are voltage-controlled semiconductor switching elements, more specifically, IGBTs. Therefore, the switching speeds of the first switch 55 and the second switch 56 can be increased as compared with the case of relay switches, and the inverter on which PWM drive is performed and the inverter on which the neutral point drive is performed can be mutually exchanged rapidly.

In the drive system 70 of the present embodiment, the high potential side connection wire LU and the low potential side connection wire LD for performing the second mode are provided. Further, the drive changeover switch 53 is provided on the high potential side connection wire LU, and maintained in the off state in the first mode. Therefore, among the switches constituting the inverter on which the neutral point drive is performed in the first mode, the upper arm switch is in a non-conducting state with the battery 40, while the lower arm switch is in a conductive state with the battery 40. Therefore, even when the lower arm switch is maintained in the on state, the inverter involved cannot serve as a neutral point.

Therefore, in the drive system 70 of the present embodiment, when the neutral point drive is performed in the first mode, the upper arm switch on the side where the drive changeover switch 53 is provided is maintained in the on state, and the lower arm switch on the side where the drive changeover switch 53 is not provided is maintained in the off state. As a result, the inverter involved can appropriately serve as a neutral point.

In the drive system 70 of the present embodiment, in the first mode, when the reference period YK has elapsed in the first drive period YH1 and the second drive period YH2, the inverter on which the PWM drive is provided and the inverter on which the neutral point drive is performed are mutually exchanged, that is, alternate selection between the first setting and the second setting is performed. Therefore, it is possible to suppress unbalanced deterioration of the switches due to unbalanced period during which the PWM drive is performed in the first inverter 20 and the second inverter 30.

In the drive system 70 of the present embodiment, when the first temperature TM1 and the second temperature TM2 are higher than the threshold temperature Ttg, the inverter on which PWM drive is performed and the inverter on which the neutral point drive is performed are mutually exchanged, that is, alternate selection between the first setting and the second setting is performed. Therefore, it is possible to suitably suppress unbalanced deterioration of the switches due to an excessive temperature rise of the inverter on which the PWM drive is performed, in the first inverter 20 and the second inverter 30.

Second Embodiment

Figure 7:
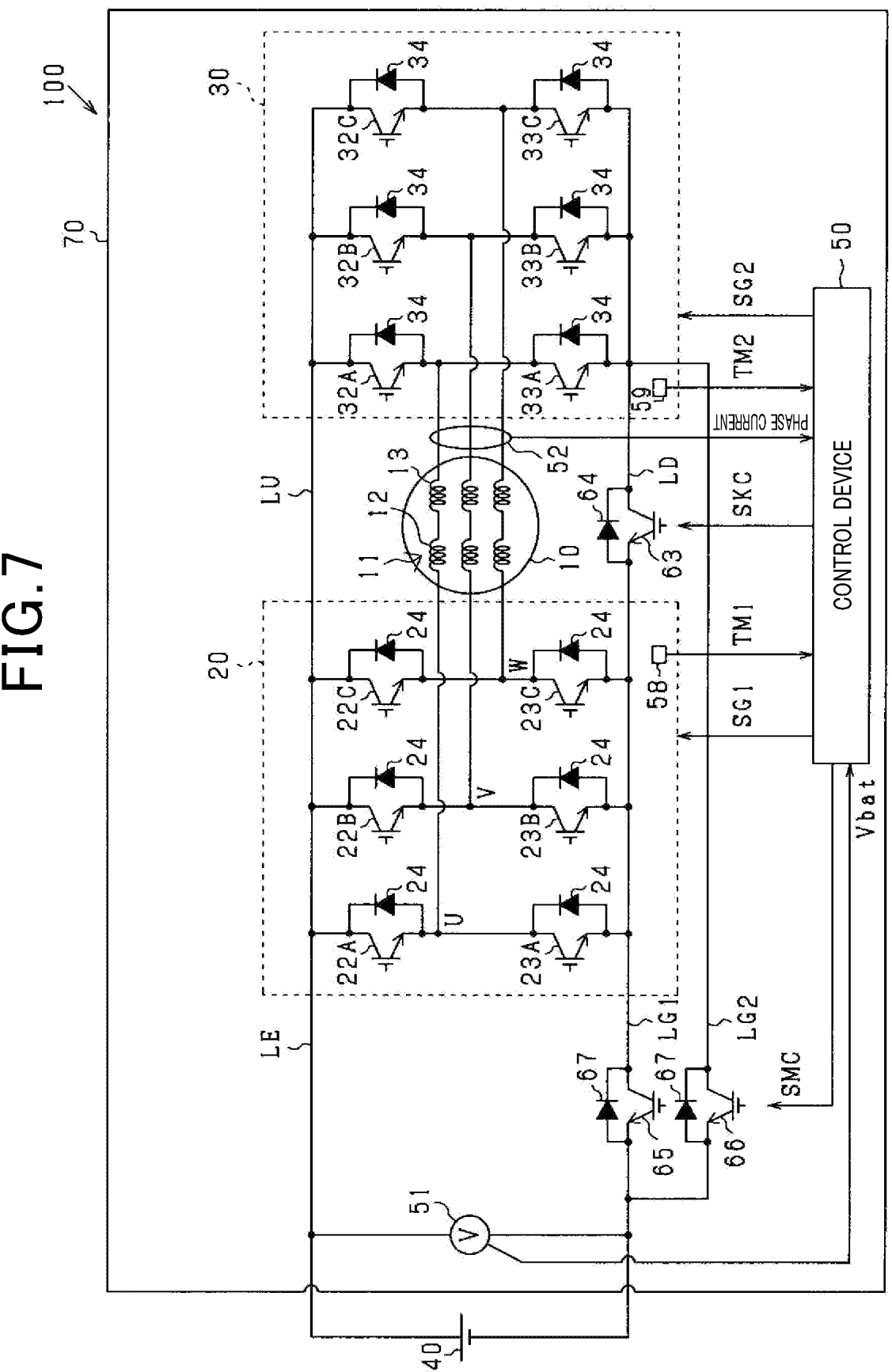
FIG. 7 is an overall configuration diagram of a drive system according to a second embodiment.

Hereinafter, a second embodiment will be described with reference to the drawings, focusing on the differences from the first embodiment. The present embodiment is different in that the drive system 70 is provided with a second ground wire LG2 instead of the second power supply wire LE2. The second ground wire LG2 connects the low potential side of the battery 40 and the low potential side of the second inverter 30 and is a route different from the ground wire LG and the low potential side connection wire LD. In the present embodiment, the first power supply wire LE1 is referred to as power supply wire LE, and the ground wire LG is referred to as first ground wire LG1. In FIG. 7, the same contents as those shown in FIG. 1 above are designated by the same reference numerals for convenience, and the description thereof will be omitted.

The present embodiment is different in that the drive system 70 includes a second drive changeover switch 63, a third switch 65, and a fourth switch 66 instead of the drive changeover switch 53, the first switch 55, and the second switch 56. The second drive changeover switch 63 is provided on the low potential side connection wire LD. In the present embodiment, voltage-controlled semiconductor switching elements are used as the second drive changeover switch 63, and, more specifically, an IGBT is used. The second drive changeover switch 63 is operated to be switched by a drive changeover signal SKC. A freewheel diode 64 is connected to the drive changeover switch 63 so that current flows from the first inverter 20 to the second inverter 30 in the forward direction. In the present embodiment, the second drive changeover switch 63 corresponds to the third switch.

The third switch 65 is provided on the first power supply wire LG1, and the fourth switch 66 is provided on the second power supply wire LG2. In the present embodiment, voltage-controlled semiconductor switching elements are used as the switches 65 and 66, and, more specifically, IGBTs are used. The third and fourth switches 65 and 66 are operated to be switched by the drive changeover signal SMC. A freewheel diode 67 is connected to each of the switches 65 and 66 so that current flows from the battery 40 to the corresponding inverter in the forward direction. In the present embodiment, the third switch 65 corresponds to the first switch, the fourth switch 66 corresponds to the second switch, and the power supply wire LE, the high potential side connection wire LU, and the second ground wire LG2 correspond to the second connecting line.

In the present embodiment, the third switch 65 is in the on state and the second drive changeover switch 63 and the fourth switch 66 are in the off state at the time of the first Y-connection drive in the first mode. In this case, the PWM drive is performed on the first inverter 20 on the side of the third switch 65 controlled to the on state, and the neutral point drive is performed on the second inverter 30 on the side of the fourth switch 66 controlled to the off state.

Further, at the time of the second Y-connection drive in the first mode, the second drive changeover switch 63 and the third switch 65 are in the off state, and the fourth switch 66 is in the on state. In this case, the PWM drive is performed on the second inverter 30 on the side of the fourth switch 66 controlled to the on state, and the neutral point drive is performed on the first inverter 20 on the side of the third switch 65 controlled to the off state.

According to the present embodiment described above, the third switch 65 is provided on the first ground wire LG1 that connects the low potential side of the battery 40 and the low potential side of the first inverter 20. Also, the fourth switch 66 is provided on the second ground wire LG2 that connects the low potential side of the battery 40 and the low potential side of the second inverter 30. One of the third switch 65 and the fourth switch 66 is controlled to the on state, and the PWM drive is performed on the inverter on the side of the switch controlled to the on state. Further, the other switch is controlled to the off state, and the neutral point drive is performed on the inverter on the side of the switch controlled to the off state. Therefore, of the third switch 65 and the fourth switch 66, the switch to be controlled to the on state is exchanged, thereby making it possible to exchange the inverter on which the PWM drive is performed and the inverter on which the neutral point drive is performed.

In particular, in the drive system 70 of the present embodiment, the third switch 65 and the fourth switch 66 are provided on the low potential side of the battery 40. Therefore, since the potential applied to the third switch 65 and the fourth switch 66 is lower than that when these switches are provided on the high potential side of the battery 40, the deterioration of these switches 65 and 66 can be suppressed.

Third Embodiment

Figure 8:
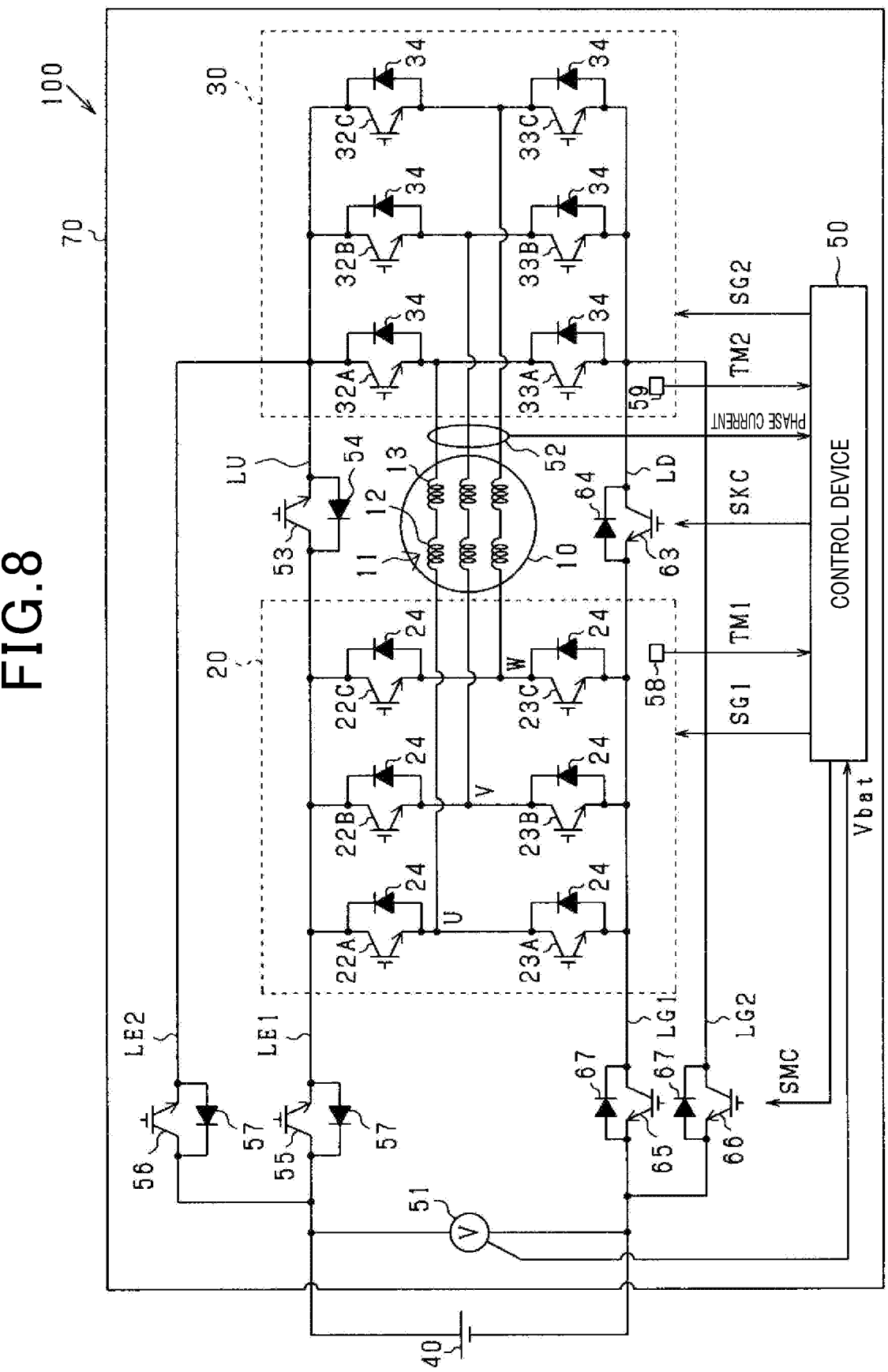
FIG. 8 is an overall configuration diagram of a drive system according to a third embodiment.

Hereinafter, a third embodiment will be described with reference to the drawings, focusing on the differences from the first embodiment and the second embodiment. The present embodiment is different in that the drive system 70 is provided with a second ground wire LG2 in addition to the second power supply wire LE2. In FIG. 8, the same contents as those shown in FIGS. 1 and 7 above are designated by the same reference numerals for convenience, and the description thereof will be omitted.

The present embodiment is different in that the drive system 70 includes a second drive changeover switch 63, a third switch 65, and a fourth switch 66 in addition to the drive changeover switch 53, the first switch 55, and the second switch 56. In the present embodiment, the drive changeover switch 53 is referred to as a first drive changeover switch 53, and the ground wire LG is referred to as a first ground wire LG1.

In the present embodiment, the first switch 55 and the third switch 65 are in the on state and the first drive changeover switch 53, the second drive changeover switch 63, the second switch 56 and the fourth switch 66 are in the off state at the time of the first Y-connection drive in the first mode. In this case, the PWM drive is performed on the first inverter 20 on the side of the first switch 55 and the third switch 65 controlled to the on state, and the neutral point drive is performed on the second inverter 30 on the side of the second switch 56 and the fourth switch 66 controlled to the off state.

Further, at the time of the second Y-connection drive in the first mode, the first drive changeover switch 53, the second drive changeover switch 63, the first switch 55 and the third switch 65 are in the off state, and the second switch 56 and the fourth switch 66 are in the on state. In this case, the PWM drive is performed on the second inverter 30 on the side of the second switch 56 and the fourth switch 66 controlled to the on state, and the neutral point drive is performed on the second inverter 20 on the side of the first switch 55 and the third switch 65 controlled to the off state.

According to the present embodiment described above, the first and third switches 55 and 65 are provided on the first power supply wire LE1 and the first ground wire LG1 that connect the battery 40 and the first inverter 20. Further, the second and fourth switches 56 and 66 are provided on the second power supply wire LE2 and the second ground wire LG2 that connect the battery 40 and the second inverter 30. One switch group of the first and third switches 55 and 65 and the second and fourth switches 56 and 66 is controlled to the on state, and the PWM drive is performed on the inverter on the side of the switch group controlled to the on state. Further, the other switch group is controlled to the off state, and the neutral point drive is performed on the inverter on the side of the switch group controlled to the off state. Therefore, of the first and third switches 55 and 65 and the second and fourth switches 56 and 66, the switches to be controlled to the on state are exchanged, thereby making it possible to exchange the inverter on which the PWM drive is performed and the inverter on which the neutral point drive is performed.

In particular, in the drive system 70 of the present embodiment, the first drive changeover switch 53 is provided on the high potential side connection wire LU, and the second drive changeover switch 63 is provided on the low potential side connection wire LD. In the first mode, the first drive changeover switch 53 and the second drive changeover switch 63 are maintained in the off state. Therefore, in the inverter on which the neutral point drive is performed in the first mode, both the upper arm switch and the lower arm switch can be maintained in the off state, and the current flowing in the inverter involved can be distributed to the upper arm switch side and the lower arm switch side. As a result, it is possible to suppress electric power loss in the inverter on which the neutral point drive is performed, as compared with the case where only one of the upper arm switch and the lower arm switch is in the off state.

Other Embodiments

Each of the above embodiments may be modified as follows and carried out.

In each of the above embodiments, the exchange control processing at the time of power running of the rotating electric machine 10 has been described, but the exchange control processing may be performed at the time of power generation of the rotating electric machine 10. Even at the time of power generation of the rotating electric machine 10, the first mode and the second mode are mutually exchanged depending on the operating state of the rotating electric machine 10, and in the first mode, the first Y-connection drive and the second Y-connection drive may be mutually exchanged based on predetermined conditions.

In each of the above embodiments, as the predetermined conditions for exchanging between the first Y-connection drive and the second Y-connection drive in the first mode, the drive periods YH1 and YH2 during which the Y-connection drive is continuously performed and the temperatures TM1 and TM2 of the inverters 20 and 30 have been illustrated. However, the predetermined conditions are not limited thereto.

For example, the first Y-connection drive and the second Y-connection drive may be mutually exchanged, that is, alternate selection between the first setting and the second setting is performed, each time when the operation of the rotating electric machine 10 is stopped. As a result, when the rotating electric machine 10 is stopped, the first Y-connection drive and the second Y-connection drive can be mutually exchanged. The time when the rotating electric machine 10 is stopped includes a period from when a stop command of the rotating electric machine 10 is issued to when the rotation of the rotating electric machine 10 is stopped and a stop period immediately before the rotating electric machine 10 starts to rotate after a start command of the rotating electric machine 10 is issued, not limited to the period during which the rotating electric machine 10 is stationary.

Also, for example, the first Y-connection drive and the second Y-connection drive may be mutually exchanged, that is, alternate selection between the first setting and the second setting is performed, each time when the operation mode of the rotating electric machine 10 is switched to the first mode. As a result, the drive changeover switch 53, and the first switch 55 and second switch 56, can be mutually exchanged in synchronization, so that the exchange control processing can be simplified.

Also, for example, the first Y-connection drive and the second Y-connection drive may be mutually exchanged, that is, alternate selection between the first setting and the second setting is performed, each time one of the power generation function of the rotating electric machine 10 and the power running function of the rotating electric machine 10 is switched to the other thereof. For example, the current path in the second Y-connection drive (see the arrows IY4 to IY6 in FIG. 4) may be longer than the current path in the first Y-connection drive (see the arrows IY1 to IY3 in FIG. 3). In this case, the first Y-connection drive having a relatively short path is performed at the time of power running of the rotating electric machine 10, thereby making it possible to effectively suppress the electric power loss of the battery 40 and to suppress over discharge of the battery 40.

In each of the above embodiments, the examples in which the first switch 55 and the second switch 56 are IGBTs have been illustrated, but the first switch 55 and the second switch 56 may be MOSFETs. Further, because the first switch 55 and the second switch 56 are smaller in number of times of switching than the switches 22 and 23 of the first inverter 20 and the switches 32 and 33 of the second inverter 30, the first switch 55 and the second switch 56 may be bidirectional switches, e.g., relay switches, having a lower switching speed than that of semiconductor switching elements. Since relay switches have a smaller on-resistance than that of semiconductor switching elements, it is possible to suppress electric power loss in the drive system 70. Further, the first switch 55, the second switch 56, and the drive changeover switch 53 may be bidirectional switches.

In each of the above embodiments, the PWM drive has been exemplified as the switching drive, but the present invention is not limited thereto. For example, rectangular drive may be performed. The rectangular drive is a drive to make control so that the upper and lower arm switches are turned on once each with a dead time in one cycle of electric angle, and the switching patterns of the upper and lower arm switches at each phase shift by 120°. Moreover, overmodulation drive may be carried out. The overmodulation drive is a drive to make control to keep the upper and lower arm switches at each phase in the on state over a plurality of carrier cycles so that the maximum value of the output voltage to the rotating electric machine 10 is 2/it times the power supply voltage Vbat of the battery 40.

In each of the above embodiments, the example in which the first mode and the second mode are mutually exchanged depending on the operating state of the rotating electric machine 10 has been illustrated, but the mode does not always have to be switched to the second mode. If the mode is not switched to the second mode, the second power supply wire LE2 and the second ground wire LG2 may be provided, and neither the high potential side connection wire LU nor the low potential side connection wire LD may be provided.

The switches included in the first inverter 20 and the second inverter 30 are not limited to IGBTs, and may be, for example, MOSFETs. In this case, body diodes of MOSFETs can be used as the diodes reversely connected to the switches, and it is not necessary to use any freewheel diode separately from the MOSFETs.

The rotating electric machine 10 is not limited to a three-phase rotating electric machine, but may be a two-phase or four-phase or more rotating electric machine. The first inverter 20 and the second inverter 30 may be any inverters having a serial connection circuit of upper and lower arm switches for the number of the phases of the rotating electric machine 10. For example, in the case of two-phase rotating electric machine, a connection point between a first set of upper and lower arm switches connected in series to each other and a connection point between a second set of upper and lower arm switches connected in series to each other are connected via inductive load (for example, winding).

Although the present disclosure has been described in accordance with the Examples, it is understood that the present disclosure is not limited to the Examples and structures. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A drive system for a rotating electric machine system, the rotating electric machine system comprising:
    a rotating electric machine including multi-phase windings, each of the multiphase windings having opposing first and second ends, and
    a power storage device that performs at least one of a power receiving task and a power supplying task with respect to the rotating electric machine,
    the drive system comprising:
    a first inverter that includes a first series circuit for each of the multi-phase windings, the first series circuit comprising an upper arm switch and a lower arm switch connected in series thereto, a first connection point between the upper arm switch and the lower arm switch for each phase winding being connected to the first end of a corresponding one of the multi-phase windings;
    a second inverter that includes a second series circuit for each of the multi-phase windings, the second series circuit comprising an upper arm switch and a lower arm switch connected in series thereto, a second connection point between the upper arm switch and the lower arm switch for each phase winding being connected to the second end of a corresponding one of the multi-phase windings;

a selection unit that performs selection between a first setting and a second setting, the first setting representing that the first inverter is set to a switch drive inverter and the second inverter is set to a neutral-point drive inverter, the second setting representing that the second inverter is set to the switch drive inverter and the first inverter is set to the neutral-point drive inverter; and a drive control unit that performs:
  a switch drive task of performing on-off driving of the upper arm switch and lower arm switch of the switch drive inverter selected by the selection unit to thereby perform one of receiving of output power from the rotating electrical machine and supply of input power to the rotating electrical machine; and
  a neutral-point drive task of maintaining, in an on state, at least one of the upper arm switch and lower arm switch of the neural-point drive inverter selected by the selection unit.

2. The drive system according to claim 1, further comprising:
a first switch that is provided on a first connection wire connecting the power storage device and the first inverter; and
a second switch that is provided on a second connection wire connecting the power storage device and the second inverter,
wherein:
the selection unit is configured to perform complementary on-off switching operations of the first switch and the second switch; and
the drive control unit is configured to:
  perform the switch drive task using, as the switch drive inverter, one of the first inverter and the second inverter being switched on by the selection unit; and
  perform the neutral-point drive task using, as the neutral-point drive inverter, the other of the first inverter and the second inverter being switched off by the selection unit.

3. The drive system according to claim 2, wherein the first switch and the second switch are semiconductor switches.

4. The drive system according to claim 2, wherein the first switch and the second switch are relay switches.

5. The drive system according to claim 2, further comprising:
a high potential connection line that connects a high potential side of the first inverter and a high potential side of the second inverter;
a low potential connection line that connects a low potential side of the first inverter and a low potential side of the second inverter;
a third switch that is provided on at least one of the high potential connection line and the low potential connection line; and
a mode control unit that selectively performs, as a control mode, one of a first mode and a second mode,
  the first mode maintaining, in the off state, the third switch, so that one of the receiving of the output power from the rotating electrical machine and the supply of the input power to the rotating electrical machine is performed by the switch drive task and the neutral-point drive task of the drive control unit,
  the second mode maintaining, in the on state, the third switch, so that one of the receiving of the output power from the rotating electrical machine and the supply of the input power to the rotating electrical machine is performed via the high and low potential connection lines;
the selection unit is configured to perform selection between the first setting and the second setting when the mode control unit selectively performs the first mode; and
the drive control unit is configured to maintain, in the on state, at least one of the upper arm switch and the lower arm switch of the neutral-point drive inverter selected by the selection unit, the at least one of the upper arm switch and the lower arm switch being connected to the at least one of the high potential connection line and the low potential connection line.

6. The drive system according to claim 5, wherein the selection unit is configured to perform alternate selection between the first setting and the second setting each time the control mode of the mode control unit is switched from the second mode to the first mode.

7. The drive system according to claim 1, further comprising:
a drive period acquisition unit that acquires a drive period of the rotating electric machine,
wherein the selection unit is configured to perform alternate selection between the first setting and the second setting in response to a predetermined value of the drive period of the rotating electric machine having elapsed.

8. The drive system according to claim 1, further comprising:
a temperature acquisition unit that acquires a temperature of the switch drive inverter,
wherein the selection unit is configured to perform alternate selection between the first setting and the second setting in response to a value of the temperature acquired by the temperature acquisition unit being higher than a predetermined threshold temperature.

9. The drive system according to claim 1, wherein the selection unit is configured to perform alternate selection between the first setting and the second setting each time the rotating electric machine is shut down.

10. The drive system according to claim 1, wherein the rotating electric machine is configured to perform:
a power generation function of generating first electric power and supplying the generated first electric power to the power storage device, and
a power running function of rotating based on second electric power supplied from the power storage device,
wherein the selection unit is configured to perform alternate selection between the first setting and the second setting each time one of the power generation function and the power running function is switched to the other thereof.

\* \* \* \* \*